US012749641B2

(12) United States Patent
Hughes

(10) Patent No.: US 12,749,641 B2
(45) Date of Patent: Sep. 29, 2026

(54) PREVENTING NUISANCE TRIPS OF GROUND-FAULT CIRCUIT INTERRUPTORS ELECTRICALLY COUPLED TO CLIMATE CONTROL SYSTEMS

(71) Applicant: Trane International Inc., Davidson, NC (US)

(72) Inventor: John Hughes, Flint, TX (US)

(73) Assignee: TRANE INTERNATIONAL INC., Davidson, NC (US)

( * ) Notice: Subject to any disclaimer, the term of this patent is extended or adjusted under 35 U.S.C. 154(b) by 170 days.

(21) Appl. No.: 18/897,155

(22) Filed: Sep. 26, 2024

(65) Prior Publication Data

US 2026/0088240 A1 Mar. 26, 2026

(51) Int. Cl.

| | |
|---|---|
| ***H01H 71/10*** | (2006.01) |
| ***F25B 49/02*** | (2006.01) |
| ***H01H 83/02*** | (2006.01) |

(52) U.S. Cl.

CPC ....... *H01H 71/1054* (2013.01); *F25B 49/025* (2013.01); *H01H 83/02* (2013.01); *F25B 2600/0253* (2013.01); *H01H 2231/012* (2013.01); *H01H 2239/03* (2013.01)

(58) Field of Classification Search

CPC .... H01H 71/10; H01H 83/02; H01H 71/1054; H01H 2231/012; F25B 49/02; F25B 49/025; F25B 2600/0253

USPC .................................................... 361/42, 118

See application file for complete search history.

(56) References Cited

U.S. PATENT DOCUMENTS

| | | | |
|---|---|---|---|
| 5,055,961 A | 10/1991 | Wiblin et al. | |
| 7,876,539 B2 | 1/2011 | Tharp | |
| 10,218,168 B2 | 2/2019 | Bangle | |
| 11,063,419 B2 | 7/2021 | Aromin | |
| 2008/0094763 A1* | 4/2008 | Tharp | H02H 9/047 361/31 |
| 2021/0194219 A1 | 6/2021 | McAfee | |
| 2022/0025894 A1 | 1/2022 | Mayleben et al. | |
| 2024/0171065 A1* | 5/2024 | Hughes | H02M 1/36 |

* cited by examiner

*Primary Examiner* — Danny Nguyen

(74) *Attorney, Agent, or Firm* — Womble Bond Dickinson (US) LLP

(57) ABSTRACT

An embodiment of an outdoor unit of a climate control system includes a refrigerant compressor, an electric motor configured to drive the refrigerant compressor, and a variable frequency drive (VFD) electrically coupled to the electric motor and configured to be electrically coupled to a ground-fault circuit interrupter (GFCI). The GFCI is electrically couped to an electrical power source. The VFD has circuitry that includes an electromagnetic interference (EMI) filter configured to at least partially filter electromagnetic interference generated by the VFD, and an inductive device that is configured to be electrically coupled to the GFCI in parallel with the EMI filter. The inductive device is configured to at least partially dissipate current discharged from the EMI filter in response to a de-energization of the electrical power source, to thereby prevent a trip of the GFCI upon re-energization of the electrical power source.

20 Claims, 5 Drawing Sheets

PREVENTING NUISANCE TRIPS OF GROUND-FAULT CIRCUIT INTERRUPTORS ELECTRICALLY COUPLED TO CLIMATE CONTROL SYSTEMS

CROSS-REFERENCE TO RELATED APPLICATIONS

Not applicable.

BACKGROUND

A climate control system may circulate a refrigerant through a refrigerant circuit to exchange heat between an interior space and an ambient environment. The refrigerant may be circulated via a compressor that is driven by an electric motor.

In some cases, the compressor may be driven at a plurality of different speeds via the electric motor to adjust a cooling or heating capacity of the climate control system during operations. Specifically, a compressor motor for a climate control system may be controlled by a variable frequency drive (VFD) to adjust a speed of the compressor during operations. While a VFD may provide a useful control system for adjusting a speed of a compressor motor for a climate control system, one or more circuits or devices of the VFD may interfere with other components in the electrical system.

BRIEF SUMMARY

Some embodiments disclosed herein are directed to an outdoor unit of a climate control system. In some embodiments, the outdoor unit includes a refrigerant compressor, an electric motor configured to drive the refrigerant compressor, and a variable frequency drive (VFD) electrically coupled to the electric motor and configured to be electrically coupled to a ground-fault circuit interrupter (GFCI). The GFCI being is couped to an electrical power source. The VFD has circuitry that includes an electromagnetic interference (EMI) filter configured to at least partially filter electromagnetic interference generated by the VFD and an inductive device that is configured to be electrically coupled to the GFCI in parallel with the EMI filter. The inductive device is configured to at least partially dissipate current discharged from the EMI filter in response to a de-energization of the electrical power source, to thereby prevent a trip of the GFCI upon re-energization of the electrical power source.

Some embodiments disclosed herein are directed to a climate control system for conditioning an interior space. In some embodiments, the climate control system includes a first heat exchanger that is configured to exchange heat between a refrigerant and the interior space, a second heat exchanger that is configured to exchange heat between the refrigerant and an ambient environment, and a compressor that is configured to circulate the refrigerant between the first heat exchanger and the second heat exchanger. In addition, the climate control system includes an electric motor that is configured to drive the compressor and a variable frequency drive (VFD) configured to control the electric motor and configured to be electrically coupled to an electrical power source via a ground-fault circuit interrupter (GFCI). The VFD is configured to operate the electric motor at a plurality of different speeds. In addition, the VFD includes an electromagnetic interference (EMI) filter configured to at least partially filter electromagnetic interference generated by the VFD and an inductive device that is configured to be electrically coupled to the GFCI in parallel with the EMI filter. The inductive device is configured to at least partially dissipate electrical current discharged from the EMI filter in response to a de-energization of the electrical power source, to thereby prevent a trip of the GFCI upon re-energization of the electrical power source.

Some embodiments disclosed herein are directed to a method of operating a climate control system to condition an interior space. In some embodiments, the method includes (a) energizing a variable frequency drive (VFD) with an electrical power source through a ground-fault circuit interrupter (GFCI) and (b) energizing an electric motor to drive a compressor of the climate control system via the VFD. In addition, the method includes (c) filtering electromagnetic interference generated in the VFD with an electromagnetic interference (EMI) filter during (a) and (b). Further, the method includes (d) dissipating electrical current discharged by the EMI filter upon a de-energization of the electrical power source with an inductive device electrically coupled to the GFCI in parallel with the EMI filter to prevent a trip of the GFCI upon re-energization of the electrical power source.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which.

DETAILED DESCRIPTION

Figure 1:
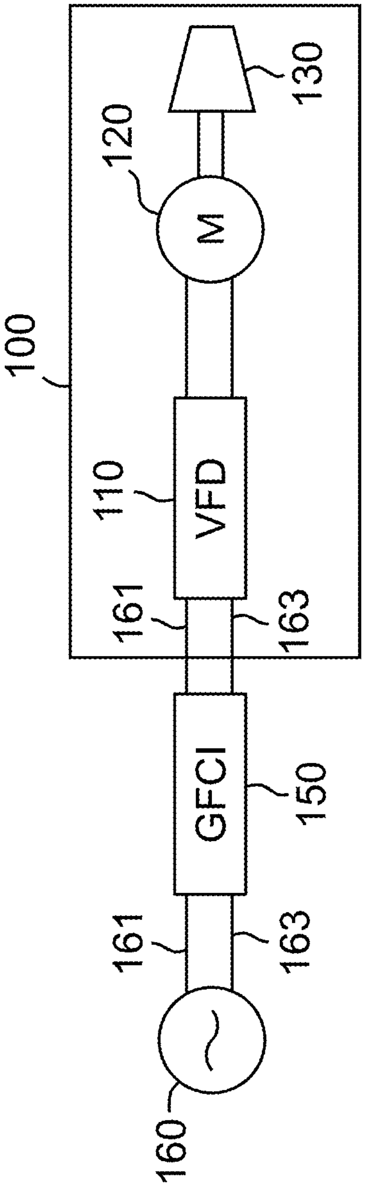
FIG. 1 is a schematic diagram of a compressor assembly for a climate control system electrically coupled to an electrical power source via a ground-fault circuit interrupter (GFCI) according to some embodiments disclosed herein.

Under some conditions, a VFD for controlling a compressor motor of a climate control system may build up a capacitive electrical charge when energized by an electrical power source. This capacitive electrical charge may then be discharged back toward the electrical power source in the event of a power failure or interruption.

One or more components of a climate control system, including the compressor motor and associated VFD, may be electrically coupled to the electrical power source via one or more safety devices that are configured to interrupt a connection to the electrical power source in the event of a fault to ground. One such safety device that may be used for this purpose is a ground-fault circuit interrupter (or GFCI). A GFCI is a circuit or device that may interrupt electrical current when current passing through the circuit is not equal and opposite, which may indicate leakage to ground.

However, the capacitive electrical current that is discharged from the VFD (or components thereof) in the event of a power failure can be conducted back to the GFCI. If the power failure is momentary in nature, the discharged electrical current and the electrical current that is supplied from the re-energized electrical power source may cause an imbalance in the GFCI. This imbalance of electrical current may thus cause the GFCI to trip, so that electrical power is cut off for the compressor motor (and potentially other components of the climate control system) under otherwise acceptable conditions. Such a trip of the GFCI may be considered a nuisance trip given that the GFCI reacted to a transient current discharge that is not associated with electrical current leakage to ground. Moreover, the loss of electrical power for the compressor motor (and potentially other components of the climate control system) prevents the climate control system from operating, which may cause the climate conditions within the interior space to fall outside of the desired range unless action is taken by the user or a technician to re-set the GFCI. Thus, an owner or user of a climate control system may wish to avoid such a nuisance trip of a GFCI resulting from a capacitive discharge from a VFD during normal operation of a climate control system.

Accordingly, embodiments disclosed herein are directed to circuitry for a climate control system (and climate control systems that employ said circuitry and related methods) for preventing a nuisance trip of a GFCI resulting from a transient capacitive current discharge from a VFD (or component thereof) in the event of a power failure or similar loss of current to the system. In some embodiments, the circuitry may include an inductive device that is configured to dissipate electrical current that is discharged in response to a loss (such as a momentary loss) of electrical current from an electrical power source. Dissipating the discharged electrical current from the VFD (or a component thereof) may prevent the electrical current from conducting back to the GFCI so that a trip of the GFCI is avoided upon the re-energization of the electrical power source. Thus, through use of the embodiments disclosed herein, at least some nuisance trips of a GFCI (or other current interrupter device) electrical coupled to a climate control device may be avoided.

Figure 6:
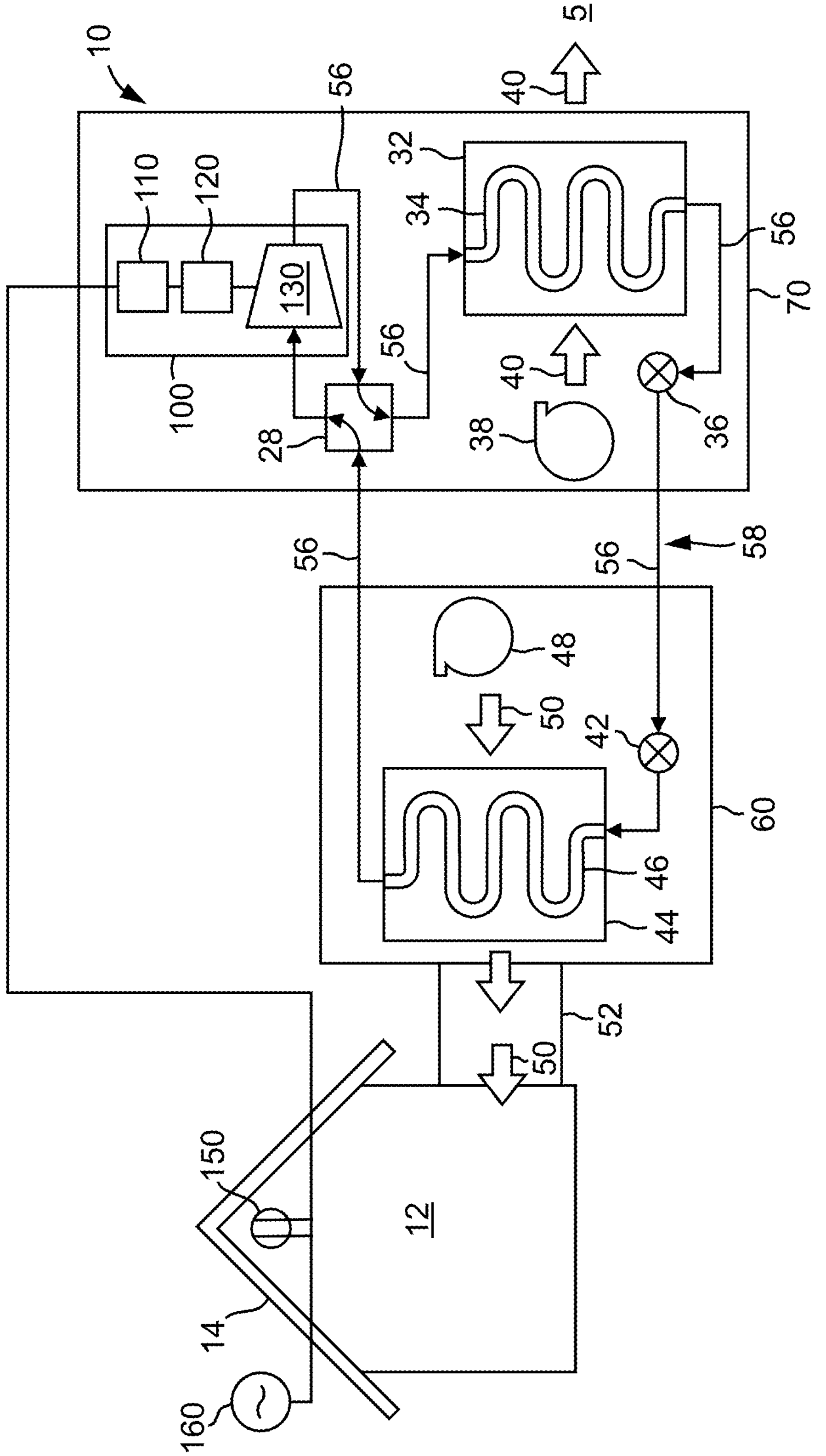
FIGS. 6 and 7 are schematic diagrams of a climate control system using an embodiment of the compressor assembly of FIG. 1 according to some embodiments disclosed herein.
Figure 7:
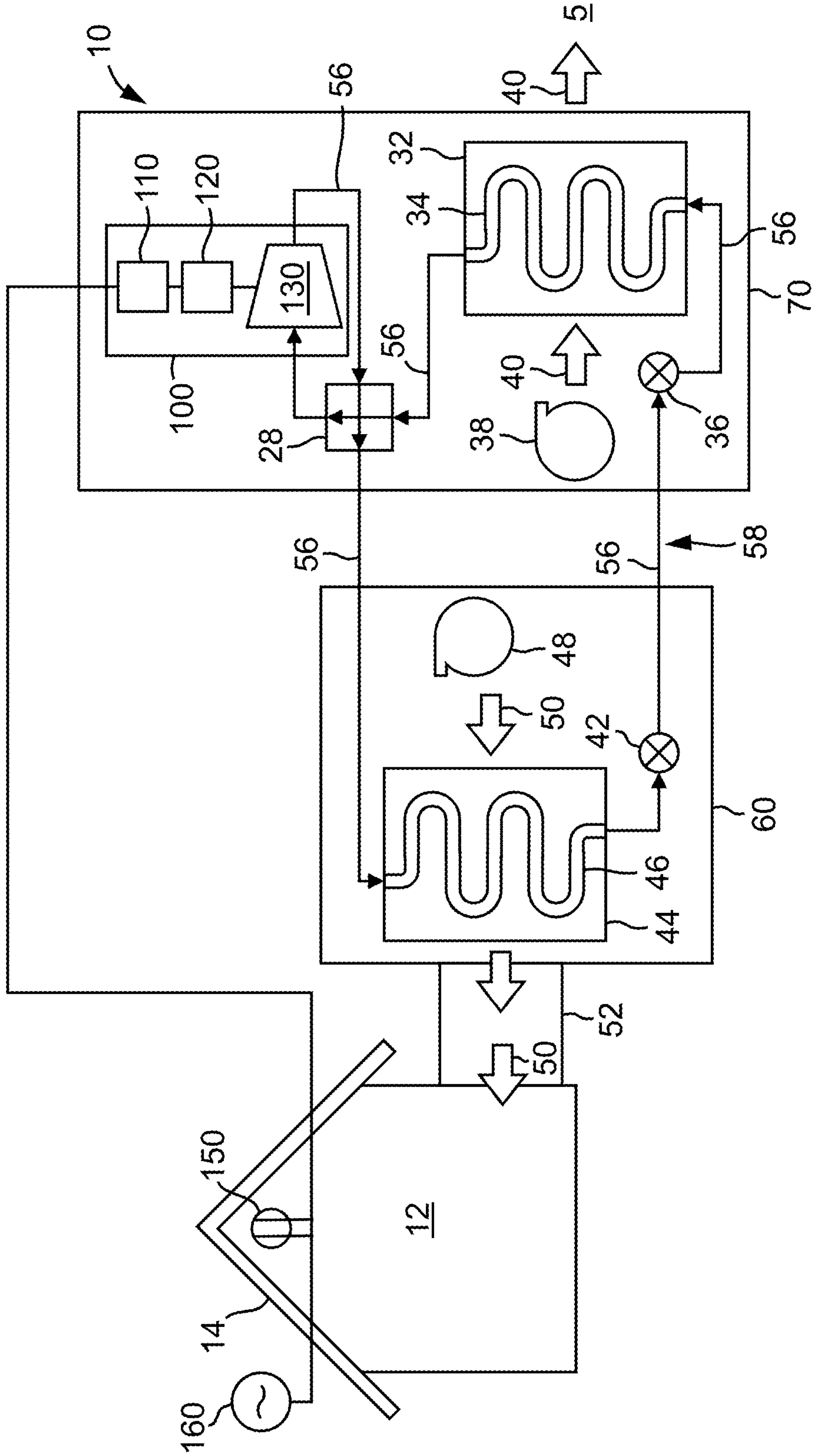

Referring now to FIG. 1, a compressor assembly 100 for a climate control system (not shown in FIG. 1, but see climate control system 10 shown in FIGS. 6 and 7). The compressor assembly 100 is electrically coupled to an electrical power source 160 via a GFCI 150. Generally speaking, the compressor assembly 100 includes a compressor 130 that is configured to compress refrigerant that is flowing within the associated climate control system (not shown). Thus, the compressor 130 may be referred to herein as a "refrigerant compressor." In addition, the compressor assembly 100 includes an electric motor 120 that is configured to drive the compressor 130, and a VFD 110 that is configured to control the operation of motor 120. Specifically, the VFD 110 may be configured to selectively operate the motor 120 (and thus the compressor 130) at a plurality of different speeds in order to adjust a heating or cooling capacity of the climate control system (not shown) during operations.

The electrical power source 160 may comprise a local utility power grid or an electrical component or circuit coupled thereto. In some embodiments, the electrical power source 160 may comprise a bus bar of a breaker box of a house or dwelling that also defines the interior space that is conditioned by the climate control system (e.g., interior space 12 shown in FIGS. 6 and 7). The bus bar may by energized by the local utility power grid via a cable, wire, or other suitable conductor.

A pair of wires 161, 163 may electrically couple the electrical power source 160 to the compressor assembly 100. Specifically, the wires 161, 163 include a source or "hot" wire 161, and a return or "neutral" wire 163. During operation, electrical current is conducted toward the compressor assembly 100 via the hot wire 161, and then is conducted back from the compressor assembly 100 to the electrical power source 160 via the neutral wire 163. Thus, the hot wire 161 and neutral wire 163 help to define a complete electrical circuit between the electrical power source 160 and compressor assembly 100.

A GFCI 150 may be electrically coupled between the compressor assembly 100 and the electrical power source 160. Specifically, the GFCI 150 may be coupled to both the hot wire 161 and the neutral wire 163. During operation, the GFCI 150 may monitor for a difference in electrical current flowing through the wires 161, 163. If the electrical current flowing in the wires 161, 163 is sufficiently different, this could indicate a leakage or fault to ground, which could result in system damage or injury (e.g., due to electrical shocks). As a result, the GFCI 150 may be configured (e.g., via internally controller, circuitry, switches or other components, etc.) to interrupt the electrical current flow from the electrical power source 160 upon detecting a sufficient difference in electrical current conducted in the wires 161, 163.

As previously described, one or more circuits or components of the VFD 110 may build up a capacitive electrical charge during operation. If the electrical power source 160 is de-energized, such as due to a power failure or flicker, the electrical current flowing in the hot wire 161 and neutral wire 163 may terminate, and the capacitive electrical charge (or a portion thereof) that has built up in the VFD 110 may discharge back into the wires 161, 163. If, during this discharge from the VFD 110, the electrical power source 160 is re-energized (e.g., such as would occur during a momentary power failure), the electrical discharge from the VFD 110 combined with the electrical current incoming from the now re-energized electrical power source 160 may cause a momentary imbalance in the electrical current flowing through the wires 161, 163. This imbalance may be sufficient to cause GFCI 150 to trip, thereby disconnecting the electrical power source 160 from the compressor assembly 100. However, in this instance, the imbalance in electrical current in the wires 161, 163 was merely a transient event that was not associated with a potentially hazardous leakage or fault to electrical ground. Thus, such a trip of the GFCI 150 may be characterized as a "nuisance trip," that is undesirable for the user or owner of the climate control system (not shown).

Figure 2:
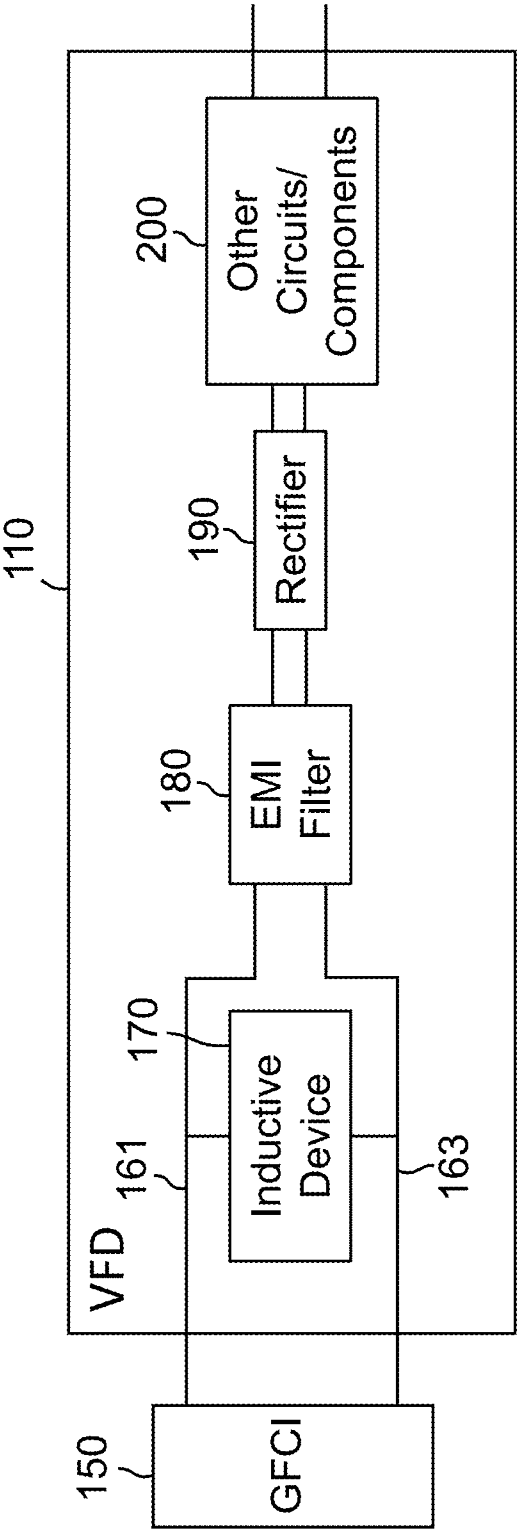
FIG. 2 is a schematic diagram of a variable frequency drive (VFD) of the compressor assembly of FIG. 1 according to some embodiments disclosed herein.

Accordingly, according to embodiments disclosed herein, the VFD 110 may include (or be electrically coupled to) one or more components that may prevent a nuisance trip of the GFCI 150 under these circumstances. Specifically, as shown in FIG. 2, in some embodiments, the VFD 110 may comprise an inductive device 170 that is configured to dissipate electrical current that is discharged by one or more other circuits/components of the VFD 110 in response to a de-energization of the electrical power source 160 (FIG. 1).

In some embodiments, the VFD 110 may include various circuits or components (which may be generally and collectively referred to herein as "circuitry"). For instance, in some embodiments, the VFD 110 may include a rectifier 190 in addition to other circuits/components 200 that are configured to facilitate the control of the motor 120 (FIG. 1) during operations. The rectifier 190 is electrically coupled between the GFCI 150 and the other circuits/components 200. The rectifier 190 may be configured to convert the alternating electrical current (AC electrical current) incoming from the electrical power source 160 into direct electrical current (DC electrical current) that is then conducted to the other circuits/components 200 and motor 120 (FIG. 1). The other circuits/components 200 may comprise various components such as, for instance, one or more power factor correction circuits, one or more DC bus capacitors, one or more inverters, and other circuits/components for facilitating the function of the VFD 110.

During operations, electromagnetic interferences (EMI) may be generated by one or more components of the VFD 110. For instance, the rectifier 190 may generate EMI via voltage distortions resulting from the conversion of AC current to DC current. In addition, other components of the VFD 110 may also generate additional EMI. The EMI generated by the VFD 110 may be conducted back toward the electrical power source 160. However, many jurisdictions limit the amount of EMI that may be conducted to a utility power grid by electrical equipment. Thus, the VFD 110 may include or be coupled to an EMI filter 180 that is configured to prevent (or at least restrict) the EMI generated in the rectifier 190 and/or other circuits/components 200 from conducting back to the electrical power source 160 during operations.

In turn, the EMI filter 180 may include or define one or more DC capacitors that may build up a capacitive electrical charge during operation. As previously described, if the electrical power source 160 (FIG. 1) is de-energized, this capacitive electrical charge built in the EMI filter 180 may discharge back toward the GFCI 150 via one or both of the wires 161, 163. One or more of the other circuits/components 200 of the VFD 110 (e.g., such as the DC bus capacitors) may also build a DC capacitive charge during operations; however, conduction of this additional DC capacitive charge back to the GFCI 150 is prevented by the rectifier 190 which effectively isolates the other circuits/components 200 from the EMI filter 180 and GFCI 150 in the event of a de-energization of the electrical power source 160.

The discharge of the EMI filter 180 may take place over a relatively short period of time, such as, less than a minute (e.g., about 30 seconds or less, about 10 second or less, about 5 seconds or less, less than 1 second, etc.). While the electrical power source 160 is de-energized, the GFCI 150 is also generally de-energized so that the DC capacitive discharge from the EMI filter 180 does not result in a trip of the GFCI 150. However, if the electrical power source 160 should re-energize while the EMI filter 180 is discharging its capacitive current, the GFCI 150 may receive AC electrical current from the electrical power source 160 while also receiving DC current discharged from the EMI filter 180. Simultaneous receipt of electrical current from the electrical current source 160 and the EMI filter 180 may cause the GFCI 150 to detect a sufficient current imbalance between the wires 161, 163 to thereby result in a nuisance trip of the GFCI 150 as previously described.

To prevent such a nuisance trip of the GFCI 150, the inductive device 170 may prevent or at least greatly restrict conduction of the DC current discharged from the EMI filter 180 back to the GFCI 150. Specifically, as described in more detail herein, the inductive device 170 may have a relatively reduced resistance to the DC discharge current from the EMI filter 180 so that the current is entirely, largely, or at least sufficiently dissipated by the inductive device 170 to thereby prevent the discharged DC current from conducting back to the GFCI 150 and possibly causing a trip of the GFCI 150 if the electrical power source 160 should re-energize quickly, as previously described.

As shown in FIG. 2, the inductive device 170 may be electrically coupled to the hot wire 161 and neutral wire 163 in parallel with the EMI filter 180. In some embodiments, the inductive device 170 may have a complex impedance having a fixed component comprising the DC resistance of the inductive device 170, and a dynamic or reactive component that changes depending on the frequency of the electrical current conducted by the inductive device 170. In some embodiments, the complex impedance of the inductive device 170 may be represented by the following expression:

$$Z = R + (j)(2\pi)(f)(L) \quad (1)$$

where: Z is the complex impedance; R is the static DC resistance of the inductive device 170; f is the frequency (in Hertz (Hz)) of the input electrical current; L is the inductance (in Henries), and j is the imaginary component $\sqrt{(-1)}$.

The inductive device 170 may be configured so that the inductance L is relatively large compared to the DC resistance R. For instance, in some embodiments, the inductive device 170 may have an inductance L that provides about a 50% larger electrical resistance at operating frequencies than its DC resistance R. In one particular example, the inductive device 170 may have about 15.9 kilo-Ohms (kOhms) DC resistance and may have about 63 Henry (H) of inductance which is equivalent to about 24 kOhms at 60 Hz. Thus, in some embodiments, the inductive device 170 may dissipate more than twice the electrical power when energized with DC current from the EMI filter 180 relative to when energized with AC current from the electrical current source 160 during normal operations (e.g., when the electrical current source 160 is providing AC current at about 60 Hz).

During operations, when the wires 161, 163 on either side of the inductive device 170 are energized with AC current (which may have a frequency of about 60 Hz), the reactive component (j*2π*f*L) from Equation (1) may dominate to provide a relatively high impedance for the inductive device 170. As a result, the inductive device 170 may not conduct (or may not conduct much of) the AC current supplied by the electrical power source 160 during normal operations with the compressor assembly 100. However, when the electrical power source 160 is de-energized (e.g., such as during a power failure or interruption), the wires 161, 163 may no longer conduct AC current from the electrical power source 160, so that the frequency term, (f), in Equation (1) above becomes zero (0), and the complex impedance Z is reduced to the DC resistance, R, only. However, because the DC resistance of the inductive device 170 is relatively low, any or most of the DC capacitive electrical charge that is discharged from the EMI filter 180 may be readily conducted into the inductive device 170 rather than the GFCI 150.

Thus, during normal operations, the relatively high impedance of the inductive device 170 may not draw any or a substantial amount of the AC current output by the electrical power source 160, but may readily conduct DC current discharged by the EMI filter due to de-energization of the electrical power source 160. Thus, the inductive device 170 may conduct a higher percentage, fraction, or amount of the DC current discharged from the EMI filter 180 than the AC electrical current supplied from electrical power source 160. Accordingly, the inductive device 170 may prevent a nuisance trip of the GFCI 150 without interfering with the normal operations of VFD 110, compressor assembly 100, or the GCI 150.

Figure 3:
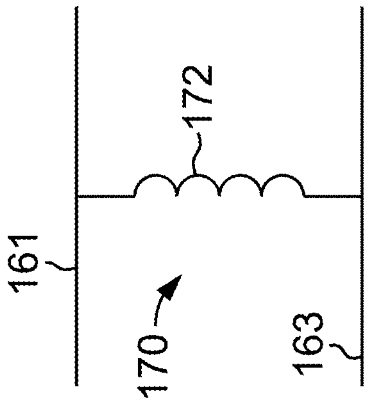
FIGS. 3-5 are schematic wiring diagrams of embodiments of an inductive device for use in the VFD of FIG. 2 according to some embodiments disclosed herein.

Referring now to FIG. 3, in some embodiments, the inductive device 170 may comprise an inductive coil (or induction coil) 172 that is configured to at least partially convert DC current (such as DC current discharged from the EMI filter 180 in FIG. 2) into magnetic energy, which thereby at least partially dissipates the DC electrical current. The inductive coil 172 may be configured as a stand-alone inductive coil (which is commonly referred to as a "choke") such as is schematically shown in FIG. 2. Alternatively, in some embodiments, the inductive device may comprise another inductive electrical component or device that includes or incorporates a suitable inductive coil 172.

Figure 4:
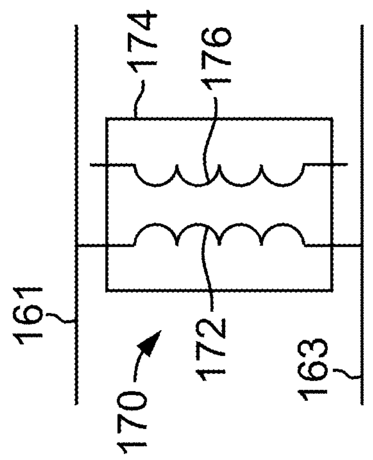

For instance, FIG. 4 shows the inductive device 170 configured as a transformer 174, wherein the inductive coil 172 comprises a the primary or input coil. The transformer 174 may also include a secondary or output inductive coil 176 that may be uncoupled from other components of the VFD 110. During operations, DC current discharged by the EMI filter 180 may be conducted through the inductive coil 172 which thereby generates a magnetic field and corresponding current in the output coil 176. In some embodiments, the output inductive coil 176 may be electrically coupled to another component or accessory (e.g., a sump heater or other accessory) to provide temporary electrical power during operations.

Figure 5:
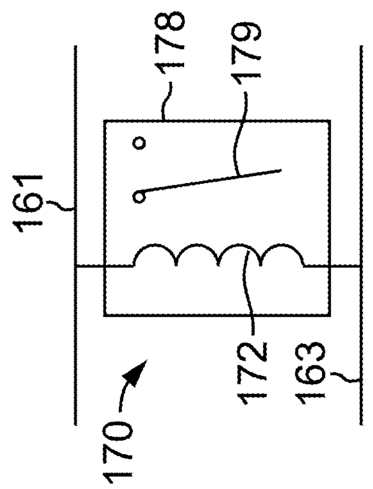

In another example, as shown in FIG. 5, the inductive device 170 may comprise a relay switch 178 including a switching element 179 that is actuated by the magnetic field generated by energization of the inductive coil 172. Like the output coil 176 of the transformer 174 shown in FIG. 4, the switching element 179 (or terminals electrically coupled thereto) may be uncoupled from other components of the VFD 110. During operations, DC current discharged by the EMI filter 180 may be conducted through the inductive coil 172 which thereby generates a magnetic field that actuates the switching element 179.

Still other example inductive devices are contemplated for use as the inductive device 170. For instance, in some embodiments, the inductive device 170 may comprise an electric motor that may or may not be connected to another device (e.g., such as a fan blade or other suitable device). As another example, in some embodiments, the inductive device 170 may comprise a light bulb (e.g., an incandescent light bulb). In some embodiments, an inductive device that may be suitable as the inductive device 170 may have an inductive or resistive load of greater than 1 Watts (W). Thus, the particular examples of an inductive device 170 shown in FIGS. 3-5 and described herein are merely exemplary of some embodiments, and are not intended to foreclose the use of other suitable inductive devices in other embodiments.

Referring now to FIGS. 6 and 7, a climate control system 10 for conditioning an interior space 12 is shown according to some embodiments disclosed herein. In particular, the climate control system 10 may include an embodiment of the compressor assembly 100 as previously described with reference to FIGS. 1-5. Thus, the compressor assembly 100 may include a VFD 110 that includes (or is coupled to) an inductive device 170 (FIGS. 2-5) that is configured to prevent a trip of a GFCI 150 coupled between the compressor assembly 100 and the electrical current source 160.

The interior space 12 is shown to include the interior space of a house or dwelling 14; however, as previously described, the interior space 12 may comprise any other suitable interior space that may be conditioned by a climate control system (e.g., climate control system 10). For instance, the interior space 12 may comprise the interior space of a building, office, retail space, storage unit, refrigerator, freezer, etc.

The climate control system 10 may be configured to circulate a refrigerant through a fluid circuit (or refrigerant circuit) 58 to transfer heat between the interior space 12 and an ambient environment 5. The ambient environment 5 may comprise an environment that at least partially surrounds the interior space 12. For instance, in the embodiment illustrated in FIG. 6, the interior space 12 is an interior space of a house 14, and the ambient environment comprises the outdoor environment that surrounds the house 14.

The climate control system 10 may include the compressor assembly 100 (including the compressor 130), a first heat exchanger 32, a pair of expansion devices 36, 42, a second heat exchanger 44, and a reversing valve 28 that are interconnected by a plurality of refrigerant lines 56 to at least partially define the fluid circuit 58. The fluid circuit 58 may circulate any suitable refrigerant (or refrigerants) during operations. For instance, in some embodiments, the fluid circuit 58 may circulate one or more refrigerants that may comprise hydrofluorocarbons (HFCs), chlorofluorocarbons (CFCs), hydrochlorofluorocarbons (HCFCs), fluorocarbons (FCs), hydrocarbons (HCs), Ammonia ($NH_3$), carbon dioxide ($CO_2$), or some combination thereof.

In the embodiment illustrated in FIGS. 6 and 7, the climate control system 10 may comprise a heat pump that may be operated to selectively cool or heat the interior space 12 via the fluid circuit 58 during operations. Thus, during a cooling mode operation of the climate control system 10 illustrated in FIG. 6, the climate control system 10 may generally transfer heat from the interior space 12 to the ambient environment 5 via the fluid circuit 58, and during a heating mode operation of the climate control system illustrated in FIG. 7, the climate control system 10 may generally transfer heat from the ambient environment 5 to the interior space 12 via the fluid circuit 58. Each of the cooling mode operation (FIG. 6) and heating mode operation (FIG. 7) will be described in more detail.

As shown in FIG. 6, during a cooling mode operation to cool the interior space 12, the compressor 130 compresses the refrigerant in a gaseous state and outputs the compressed refrigerant to the reversing valve 28, which may then route the compressed refrigerant to the first heat exchanger 32. In the cooling mode operation of FIG. 6, the first heat exchanger 32 is configured to facilitate heat transfer from the refrigerant to the ambient environment 5. Specifically, the refrigerant may flow through one or more coils 34 of the first heat exchanger 32, while a fan 38 generates an airflow 40 that is flowed over and around the one or more coils 34 to thereby draw heat away from the refrigerant flowing therein. The airflow 40 is then directed away from the first heat exchanger 32 and into the ambient environment 5. The transfer of heat from the refrigerant to the airflow 40 via the first heat exchanger 32 may cause the refrigerant to at least partially condense to a liquid, such that the first heat exchanger 32 may function as a "condenser" when operating in the cooling mode of FIG. 6.

The liquid (or substantially liquid) refrigerant is then directed through the first expansion device 36 and then the second expansion device 42. In the cooling mode operation of FIG. 6, the first expansion device 36 may be positioned or actuated as to not substantially restrict or meter the flow of refrigerant therethrough. However, the second expansion device 42 may be actuated or set so as to controllably constrict and expand the flow of refrigerant so as to reduce a temperature thereof. The first expansion device 36 and second expansion device 42 may comprise expansion valves, such as electronic expansion valves (EEVs) that are actuated by a controller (e.g., controller 80 described herein). Alternatively, the first expansion device 36 and the second expansion device 42 may comprise a thermostatic expansion valve (TXV) that is configured to adjust in position (that is, in opening position) in response to one or more pressures and/or temperatures of the refrigerant flowing in the fluid circuit 58 (or a portion thereof).

The expanded, cold refrigerant is then directed through the second heat exchanger 44 which is configured to transfer heat from an airflow 50 generated by a blower 48 to the refrigerant. Specifically, the refrigerant may flow through one or more coils 46 of the second heat exchanger 44, while the blower 48 generates the airflow 50 that is flowed over and around the one or more coils 46 to thereby draw heat away from the airflow 50 and into the refrigerant.

The cooled airflow 50 is then discharged from the second heat exchanger 44 to the interior space 12 so as to reduce a temperature (and relatively humidity) therein. The airflow 50 may be discharged from the second heat exchanger 44 to the interior space 12 via suitable ducting 52 (e.g., rigid ducts, flexible hoses, or any other suitable fluid conveyance system).

The transfer of heat from the airflow 50 to the refrigerant via the second heat exchanger 44 may cause the refrigerant to vaporize or at least partially vaporize to a gas, such that the second heat exchanger 44 may function as an "evaporator" when operating in the cooling mode of FIG. 6. The vaporized (or partially vaporized) refrigerant may progress from the second heat exchanger 44 back to the compressor 130 via the reversing valve 28 so as to restart the cycle described above.

Referring now to FIG. 7, during a heating mode of the climate control system 10 the flow direction of the refrigerant in the fluid circuit 58 is generally reversed from that described for the cooling mode operation (FIG. 6). Specifically, during a heating mode operation, the reversing valve 28 is actuated so as to route the compressed refrigerant emitted from the compressor 130 to the second heat exchanger 44 rather than the first heat exchanger 32. As a result, in the heating mode operation shown in FIG. 7, the second heat exchanger 44 is configured to transfer heat from the refrigerant to the interior space 12 via airflow 50 so as to condense the refrigerant. Thus, in the heating mode operation of FIG. 7, the second heat exchanger 44 functions as a "condenser" for the refrigerant. The condensed refrigerant is then directed through the second expansion device 42 and the first expansion device 36; however, in the heating mode operation of FIG. 7, the second expansion device 42 is positioned or actuated so as to not substantially restrict or meter the flow of refrigerant therethrough, and the first expansion device 36 is actuated so as to controllably constrict and expand the flow of refrigerant so as to reduce a temperature thereof.

The expanded, cold refrigerant is then directed through the first heat exchanger 32 which is configured to transfer heat form the airflow 40 to the refrigerant to thereby vaporize the refrigerant and cool the airflow 40. Thus, in the heating mode operation, the first heat exchanger 32 functions the "evaporator" for the refrigerant. Finally, the vaporized refrigerant is routed ack to the compressor 130 via the reversing valve 28 to restart the cycle described above.

Referring again to FIGS. 6 and 7, in some embodiments, the second heat exchanger 44, second expansion device 42, and blower 48 may be embodied as an at least partially integrated first unit 60. In addition, in some embodiments, the first heat exchanger 32, first expansion device 36, fan 38, reversing valve 28, and compressor assembly 100 may be embodied as an at least partially integrated second unit 70. In some embodiments, the first unit 60 may be positioned in any suitable indoor space that may or may not be the same (or connected to) the interior space 12. For instance, the first unit 60 may be positioned in an attic, storage room, basement, building, enclosure, that is proximate to, connected to, or at least partially integrated (or inside of) the interior space 12. Likewise, the second unit 70 may be positioned in the ambient environment 5, which (as previously described) may be outdoors. Thus, in some embodiments, the first unit 60 may be referred to herein as an "indoor unit" and the second unit 70 may be referred to as an "outdoor unit."

However, these example positions of the units 60, 70 are not intended to limit a particular location of either of the units 60, 70 in various embodiments. For example, in some embodiment, the first unit 60 and second unit 70 may be at least partially integrated with one another and co-located in single location. For instance, in some embodiments, the first unit 60 and the second unit 70 may be integrated with one another as a so-called "packaged unit" and located in the ambient environment 5. In some embodiments, the at least partially integrated units 60, 70 (e.g., as a packaged unit) may be positioned on a rooftop of the house 14, dwelling, building, etc. that defines the interior space 12.

The climate control system 10 may be operable to deliver different cooling or heating capacities to the interior space 12 during operation in the cooling mode (FIG. 6) or heating mode (FIG. 7). Specifically, the different cooling or heating capacities may be achieved via different flow rates of refrigerant in the fluid circuit 58 via adjustments in the speed of compressor 130. Specifically, as the flow rate of refrigerant increases in the fluid circuit 58, the rate of heat transfer in the heat exchangers 32, 44 may also increase, which may in turn increase the rate of heat transfer between the refrigerant the interior space 12 and ambient environment 5. The different speeds of the compressor 130 may be achieved via different speeds for the motor 120 via the VFD 110 as previously described. In some embodiments, the flow rates of the airflows 40, 50 may also be adjusted (e.g., via fan 38 and blower 48, respectively) in concert with the changes in the speed of the compressor 130. That is, the blower 48 and the fan 38 may be configured to operate at a plurality of different speeds to as to vary the speed or flow rate of the airflows 50 and 40, respectively.

In some embodiments the climate control system 10 may not comprise a heat pump and may utilize a supplemental heating assembly to heat the interior space 12. Thus, the illustration of the climate control system 10 as a heat pump is merely exemplary of some embodiments.

Figure 8:
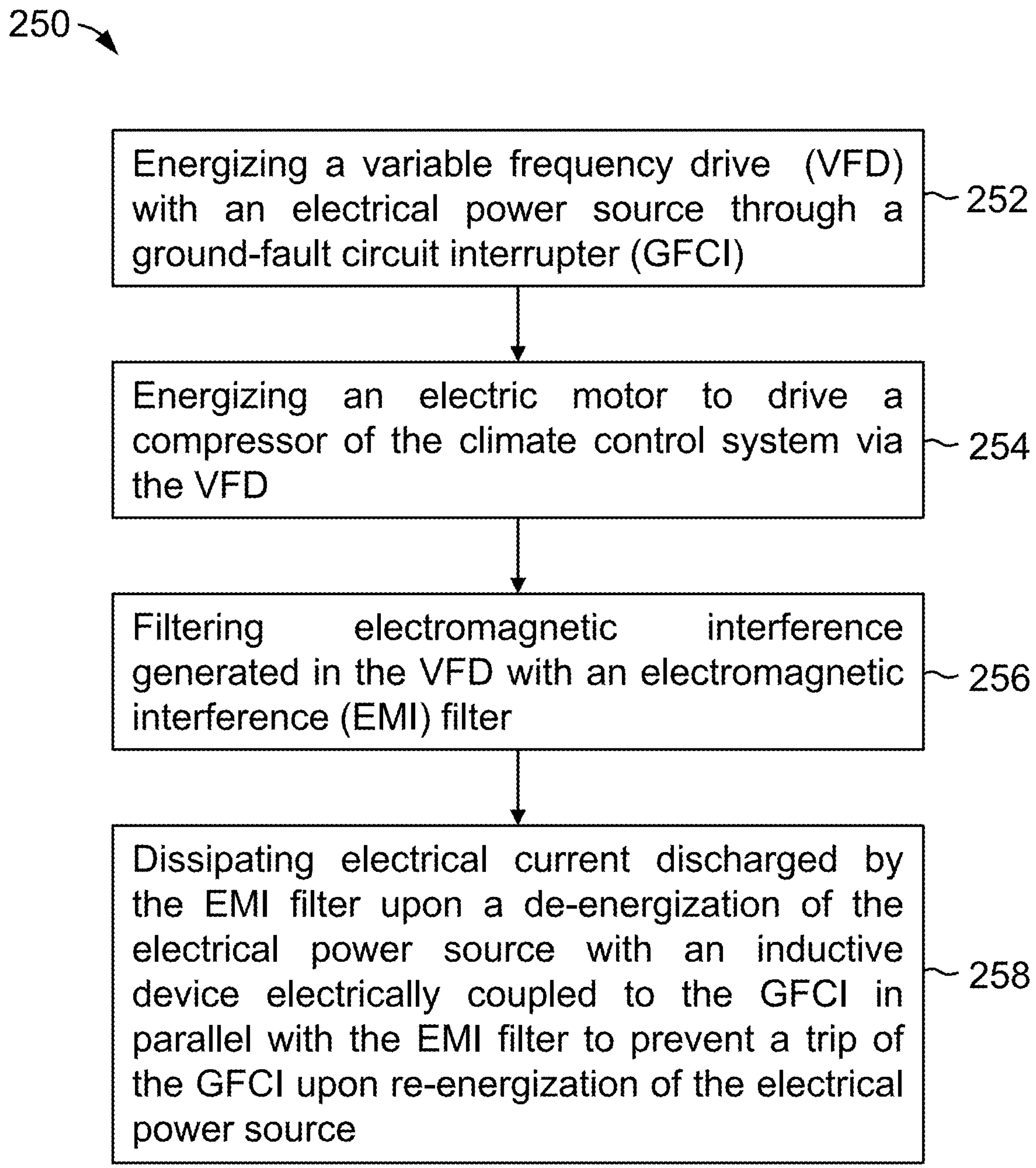
FIG. 8 is a flow diagram of a method of operating a climate control system according to some embodiments disclosed herein.

Referring now to FIG. 8, a method 250 of operating a climate control system to condition an interior space is shown according to some embodiments. The method 250 may be performed using one or more embodiments of the climate control system 10 shown in FIGS. 6 and 7 and previously described (which may include embodiments of the compressor assembly 100 or components thereof as shown in FIGS. 1-4 and previously described). Thus, in describing the features of method 250, continuing reference is made to FIGS. 1-7 and the features illustrated herein. However, it should be appreciated that embodiments of method 250 may be performed using systems that may be different in at least some respect from those shown in FIGS. 1-7. Accordingly, the continuing reference to FIGS. 1-7 when describing the features of method 250 is merely meant to be illustrative of some embodiments and should not be interpreted as limiting other embodiments of method 250.

As shown in FIG. 8, method 250 includes energizing a variable frequency drive (VFD) with an electrical power source through a ground-fault circuit interrupter (GFCI) at block 252. In addition, method 250 includes energizing an electric motor to drive a compressor of the climate control system via the VFD at block 254. For instance, as previously described for the compressor assembly 100 (FIGS. 1 and 2), the electrical power source 160 may energize the VFD 110 which may in turn energize and control the operation of the electric motor 120 to drive compressor 130.

In addition, method 250 includes filtering electromagnetic interference generated in the VFD with an electromagnetic interference (EMI) filter at block 256. For instance, as previously described, the EMI filter 180 may filter out some or all of the electromagnetic interference that is generated by the circuitry of the VFD 110 (including the rectifier 190 and/or other circuits/components 200).

Further, method 250 includes dissipating electrical current discharged by the EMI filter upon a de-energization of the electrical power source with an inductive device electrically coupled to the GFCI in parallel with the EMI filter to prevent a trip of the GFCI upon re-energization of the electrical power source at block 258. For instance, as previously described, the inductive device 170 shown in FIG. 2 may dissipate DC current discharged from the EMI filter 180 as a result of de-energization of the electrical power source 160. Thus, the electrical current discharged from the EMI filter 180 is prevented (or at least restricted) from conducting back to the GFCI 150. As a result, if the electrical power source 160 should re-energize while the EMI filter 180 is discharging the stored capacitive current, the GFCI 150 may be prevented from detecting the additional current output from the EMI filter 180 so as to prevent a trip of the GFCI 150.

As previously described, in some embodiments, the inductive device may have a relatively high impedance to the AC current output from the electrical current source 160, and a relatively a low resistance to the DC electrical current discharged from the EMI filter 180. For instance, in some embodiments, the inductive device 170 may dissipate more than twice the electrical power when energized with DC current from the EMI filter 180 relative to when energized with AC current from the electrical current source 160 during normal operations (e.g., when the electrical current source 160 is providing AC current at about 60 Hz). Thus, in some embodiments, the method 250 may include conducting a first fraction or percentage of the electric current from the electrical power source through the inductive device in block 252, and conducting a second fraction or percentage of the electric current discharged by the EMI filter through the inductive device in block 258. The first fraction or percentage may be less than the second fraction or percentage.

As explained above and reiterated below, the present disclosure includes, without limitation, the following example implementations.

Clause 1: An outdoor unit of a climate control system, the outdoor unit comprising: a refrigerant compressor; an electric motor configured to drive the refrigerant compressor; and a variable frequency drive (VFD) electrically coupled to the electric motor and configured to be electrically coupled to a ground-fault circuit interrupter (GFCI), the GFCI being electrically couped to an electrical power source, and the VFD including circuitry that comprises: an electromagnetic interference (EMI) filter configured to at least partially filter electromagnetic interference generated by the VFD; and an inductive device that is configured to be electrically coupled to the GFCI in parallel with the EMI filter, the inductive device being configured to at least partially dissipate current discharged from the EMI filter in response to a de-energization of the electrical power source, to thereby prevent a trip of the GFCI upon re-energization of the electrical power source.

Clause 2: The outdoor unit of any of the clauses, wherein the electrical power source is configured to provide alternating electrical current (AC electrical current), wherein the EMI filter is configured to discharge direct electrical current (DC electrical current) in response to the de-energization of the electrical power source, and wherein the inductive device is configured to conduct a greater amount of the DC electrical current than the AC electrical current.

Clause 3: The outdoor unit of any of the clauses, wherein the inductive device comprises an inductive coil that is configured to conduct the DC electrical current discharged from the EMI filter.

Clause 4: The outdoor unit of any of the clauses, wherein the inductive device comprises a choke.

Clause 5: The outdoor unit of any of the clauses, wherein the inductive device comprises a relay switch having the inductive coil and a switching element such that energization of the inductive coil with the DC electrical current is configured to actuate the switching element.

Clause 6: The outdoor unit of any of the clauses, wherein the switching element is not electrically coupled to another component.

Clause 7: The outdoor unit of any of the clauses, wherein the VFD comprises: a rectifier; and one or more other circuits, wherein the rectifier is electrically coupled between the EMI filter and the one or more other circuits, and wherein the rectifier is configured to electrically isolate the one or more other circuits from the EMI filter when the electrical power source is de-energized.

Clause 8: A climate control system for conditioning an interior space, the climate control system comprising: a first heat exchanger that is configured to exchange heat between a refrigerant and the interior space; a second heat exchanger that is configured to exchange heat between the refrigerant and an ambient environment; a compressor that is configured to circulate the refrigerant between the first heat exchanger and the second heat exchanger; an electric motor that is configured to drive the compressor; a variable frequency drive (VFD) configured to control the electric motor and configured to be electrically coupled to an electrical power source via a ground-fault circuit interrupter (GFCI), the VFD configured to operate the electric motor at a plurality of different speeds, and the VFD including: an electromagnetic interference (EMI) filter configured to at least partially filter electromagnetic interference generated by the VFD; and an inductive device that is configured to be electrically coupled to the GFCI in parallel with the EMI filter, the inductive device being configured to at least partially dissipate electrical current discharged from the EMI filter in response to a de-energization of the electrical power source, to thereby prevent a trip of the GFCI upon re-energization of the electrical power source.

Clause 9: The climate control system any of the clauses, wherein electrical power source is configured to provide alternating electrical current (AC electrical current), wherein the EMI filter is configured to discharge direct electrical current (DC electrical current) in response to the de-energization of the electrical power source, and wherein the inductive device is configured to conduct a greater amount of the DC electrical current than the AC electrical current.

Clause 10: The climate control system of any of the clauses, wherein the inductive device comprises an inductive coil that is configured to conduct the DC electrical current discharged from the EMI filter.

Clause 11: The climate control system of any of the clauses, wherein the inductive device comprises a choke.

Clause 12: The climate control system of any of the clauses, wherein the inductive device comprises a relay switch having the inductive coil and a switching element such that energization of the inductive coil with the DC electrical current is configured to actuate the switching element.

Clause 13: The climate control system of any of the clauses, wherein the switching element is not electrically coupled to another component.

Clause 14: The climate control system of any of the clauses, wherein the VFD further includes: a rectifier electrically coupled between the EMI filter and the electric motor, wherein the rectifier is configured to electrically isolate other circuitry of the VFD from the EMI filter when the electrical power source is de-energized.

Clause 15: A method of operating a climate control system to condition an interior space, the method comprising: (a) energizing a variable frequency drive (VFD) with an electrical power source through a ground-fault circuit interrupter (GFCI); (b) energizing an electric motor to drive a compressor of the climate control system via the VFD; (c) filtering electromagnetic interference generated in the VFD with an electromagnetic interference (EMI) filter during (a) and (b); and (d) dissipating electrical current discharged by the EMI filter upon a de-energization of the electrical power source with an inductive device electrically coupled to the GFCI in parallel with the EMI filter to prevent a trip of the GFCI upon re-energization of the electrical power source.

Clause 16: The method of any of the clauses, (e) conducting a first fraction of electric current supplied from the electrical power source through the inductive device during (a); and (f) conducting a second fraction of the electric current discharged by the EMI filter through the inductive device during (d), the second fraction being greater than the first fraction.

Clause 17: The method of any of the clauses, wherein (d) comprises at least partially dissipating the electric current discharged by the EMI filter via an inductive coil of the inductive device.

Clause 18: The method of any of the clauses, wherein (d) comprises actuating a switching element of the inductive device via the electric current conducted by the inductive coil.

Clause 19: The method of any of the clauses, further comprising: (g) electrically isolating other circuitry in the VFD with a rectifier electrically coupled to the EMI filter upon de-energization of the electrical power source.

Clause 20: The method of any of the clauses, further comprising: (h) building a capacitive electrical charge in the EMI filter during (c).

Embodiments disclosed herein are directed to circuitry for climate control systems (and climate control systems that employ said circuitry and related methods) for preventing a nuisance trip of a GFCI resulting from a transient capacitive current discharge from a VFD (or component thereof) in the event of a power failure. In some embodiments, the circuitry may include an inductive device that is configured to dissipate electrical current that is discharged in response to a loss (such as a momentary loss) of electrical current from an electrical power source. Dissipating the discharged electrical current from the VFD (or a component thereof) may prevent the electrical current from conducting back to the GFCI so that a trip of the GFCI is avoided upon the re-energization of the electrical power source. Thus, through use of the embodiments disclosed herein, at least some nuisance trips of a GFCI (or other current interrupter device) electrically coupled to a climate control device may be avoided.

In some embodiments, the inductive device 170 may be replaced with a resistive load. However, use of a resistive load to dissipate DC current output by EMI filter 180 may also result in increased power dissipation via the resistive load during normal operations, when electrical power source 160 is providing electrical current. In some embodiments, a rectifier (e.g., similar to rectifier 190 may be electrically coupled between the EMI filter 180 and the GFCI 150 to prevent trips of the GFCI 150 by isolating the EMI filter 180 in the event of a temporary power loss from electrical power source 160.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like, when used in reference to a stated value mean within a range of plus or minus 10% of the stated value.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An outdoor unit of a climate control system, the outdoor unit comprising:
- a refrigerant compressor;
- an electric motor configured to drive the refrigerant compressor; and
- a variable frequency drive (VFD) electrically coupled to the electric motor and configured to be electrically coupled to a ground-fault circuit interrupter (GFCI), the GFCI being electrically couped to an electrical power source, and the VFD including circuitry that comprises:
  - an electromagnetic interference (EMI) filter configured to at least partially filter electromagnetic interference generated by the VFD; and
  - an inductive device that is configured to be electrically coupled to the GFCI in parallel with the EMI filter, the inductive device being configured to at least partially dissipate current discharged from the EMI filter in response to a de-energization of the electrical power source, to thereby prevent a trip of the GFCI upon re-energization of the electrical power source.

2. The outdoor unit of claim 1,
- wherein the electrical power source is configured to provide alternating electrical current (AC electrical current),
- wherein the EMI filter is configured to discharge direct electrical current (DC electrical current) in response to the de-energization of the electrical power source, and
- wherein the inductive device is configured to conduct a greater amount of the DC electrical current than the AC electrical current.

3. The outdoor unit of claim 2, wherein the inductive device comprises an inductive coil that is configured to conduct the DC electrical current discharged from the EMI filter.

4. The outdoor unit of claim 3, wherein the inductive device comprises a choke.

5. The outdoor unit of claim 3, wherein the inductive device comprises a relay switch having the inductive coil and a switching element such that energization of the inductive coil with the DC electrical current is configured to actuate the switching element.

6. The outdoor unit of claim 5, wherein the switching element is not electrically coupled to another component.

7. The outdoor unit of claim 3, wherein the VFD comprises:
- a rectifier; and
- one or more other circuits, wherein the rectifier is electrically coupled between the EMI filter and the one or more other circuits, and wherein the rectifier is configured to electrically isolate the one or more other circuits from the EMI filter when the electrical power source is de-energized.

8. A climate control system for conditioning an interior space, the climate control system comprising:
- a first heat exchanger that is configured to exchange heat between a refrigerant and the interior space;
- a second heat exchanger that is configured to exchange heat between the refrigerant and an ambient environment;
- a compressor that is configured to circulate the refrigerant between the first heat exchanger and the second heat exchanger;
- an electric motor that is configured to drive the compressor;
- a variable frequency drive (VFD) configured to control the electric motor and configured to be electrically coupled to an electrical power source via a ground-fault circuit interrupter (GFCI), the VFD configured to operate the electric motor at a plurality of different speeds, and the VFD including:
  - an electromagnetic interference (EMI) filter configured to at least partially filter electromagnetic interference generated by the VFD; and
  - an inductive device that is configured to be electrically coupled to the GFCI in parallel with the EMI filter, the inductive device being configured to at least partially dissipate electrical current discharged from the EMI filter in response to a de-energization of the electrical power source, to thereby prevent a trip of the GFCI upon re-energization of the electrical power source.

9. The climate control system of claim 8,
- wherein electrical power source is configured to provide alternating electrical current (AC electrical current),
- wherein the EMI filter is configured to discharge direct electrical current (DC electrical current) in response to the de-energization of the electrical power source, and
- wherein the inductive device is configured to conduct a greater amount of the DC electrical current than the AC electrical current.

10. The climate control system of claim 9, wherein the inductive device comprises an inductive coil that is configured to conduct the DC electrical current discharged from the EMI filter.

11. The climate control system of claim 10, wherein the inductive device comprises a choke.

12. The climate control system of claim 10, wherein the inductive device comprises a relay switch having the inductive coil and a switching element such that energization of the inductive coil with the DC electrical current is configured to actuate the switching element.

13. The climate control system of claim 12, wherein the switching element is not electrically coupled to another component.

14. The climate control system of claim 10, wherein the VFD further includes:
- a rectifier electrically coupled between the EMI filter and the electric motor, wherein the rectifier is configured to electrically isolate other circuitry of the VFD from the EMI filter when the electrical power source is de-energized.

15. A method of operating a climate control system to condition an interior space, the method comprising:
- (a) energizing a variable frequency drive (VFD) with an electrical power source through a ground-fault circuit interrupter (GFCI);

(b) energizing an electric motor to drive a compressor of the climate control system via the VFD;

(c) filtering electromagnetic interference generated in the VFD with an electromagnetic interference (EMI) filter during (a) and (b); and (d) dissipating electrical current discharged by the EMI filter upon a de-energization of the electrical power source with an inductive device electrically coupled to the GFCI in parallel with the EMI filter to prevent a trip of the GFCI upon re-energization of the electrical power source.

16. The method of claim 15, further comprising:

(e) conducting a first fraction of electric current supplied from the electrical power source through the inductive device during (a); and (f) conducting a second fraction of the electric current discharged by the EMI filter through the inductive device during (d), the second fraction being greater than the first fraction.

17. The method of claim 16, wherein (d) comprises at least partially dissipating the electric current discharged by the EMI filter via an inductive coil of the inductive device.

18. The method of claim 17, wherein (d) comprises actuating a switching element of the inductive device via the electric current conducted by the inductive coil.

19. The method of claim 18, further comprising:

(g) electrically isolating other circuitry in the VFD with a rectifier electrically coupled to the EMI filter upon de-energization of the electrical power source.

20. The method of claim 15, further comprising:

(h) building a capacitive electrical charge in the EMI filter during (c).

* * * * *